US007674878B2

United States Patent
Hanimann et al.

(10) Patent No.: US 7,674,878 B2
(45) Date of Patent: Mar. 9, 2010

(54) METHOD FOR PRODUCING NON-STICKING GRANULES FROM A POLYESTER MATERIAL AND FOR THE FURTHER PROCESSING OF GRANULES PRODUCED IN THIS WAY

(75) Inventors: Kurt Hanimann, Rodels/Pratval (CH); Werner Stibal, Chur (CH)

(73) Assignee: Uhde Inventa-Fischer AG, Domat/Ems (CH)

( * ) Notice: Subject to any disclaimer, the term of this patent is extended or adjusted under 35 U.S.C. 154(b) by 0 days.

(21) Appl. No.: 12/282,469

(22) PCT Filed: Mar. 13, 2007

(86) PCT No.: PCT/EP2007/002211

§ 371 (c)(1),
(2), (4) Date: Nov. 6, 2008

(87) PCT Pub. No.: WO2007/104536

PCT Pub. Date: Sep. 20, 2007

(65) Prior Publication Data

US 2009/0057936 A1  Mar. 5, 2009

(30) Foreign Application Priority Data

Mar. 13, 2006  (CH) ..................... 0395/06

(51) Int. Cl.
*C08F 6/00*  (2006.01)
*C08G 63/00*  (2006.01)

(52) U.S. Cl. .................. 528/480; 156/256; 156/265; 156/510; 428/66.4; 428/220; 428/402; 428/413; 428/421; 523/351; 528/176; 528/190; 528/192; 528/193; 528/194

(58) Field of Classification Search ............... 156/256, 156/265, 510; 428/66.4, 220, 402, 413, 421; 523/351; 528/176, 190, 192, 193, 194
See application file for complete search history.

(56) References Cited

U.S. PATENT DOCUMENTS

| 7,084,235 B2 | 8/2006 | Otto et al. |
| 2005/0085620 A1 | 4/2005 | Bruckmann |
| 2005/0110182 A1 | 5/2005 | Eloo |
| 2005/0215753 A1 | 9/2005 | Otto et al. |

FOREIGN PATENT DOCUMENTS

| DE | 19848245 A1 | 10/1998 |
| DE | 102004015515 A1 | 9/2004 |
| DE | 102004050356 A1 | 7/2005 |
| DE | 10349016 B4 | 10/2005 |
| EP | 1522395 A1 | 4/2005 |

OTHER PUBLICATIONS

International Search Report and Written Opinion for PCT/EP2007/002211 completed Jun. 28, 2007.
The International Preliminary Report on Patentability under Chapter II dated Feb. 21, 2008.
English Translation of the International Preliminary Report on Patentability dated Nov. 13, 2008.

*Primary Examiner*—Terressa M Boykin
(74) *Attorney, Agent, or Firm*—Barnes & Thornburg LLP

(57) ABSTRACT

Disclosed is a method of producing a non-adhering granulate above the glass-transition temperature comprising a polyester material, in which the polyester material is introduced into a cooling water flow as a melt and is separated from the cooling water after passing through a cooling stretch. The dwell time of the polyester material in the cooling stretch is 0.2-5 sec, and the cooling water has a pressure of at least 2 bar along the cooling stretch. For the thus obtained granulate, post-crystallization is not required, at least not in every case. It has been shown that the granulate does not adhere, even without post-crystallization and mechanical movement if no additional external input of energy takes place. Even during heating under pressure, no adhesion could be observed.

16 Claims, 2 Drawing Sheets

METHOD FOR PRODUCING NON-STICKING GRANULES FROM A POLYESTER MATERIAL AND FOR THE FURTHER PROCESSING OF GRANULES PRODUCED IN THIS WAY

This application is a U.S. national phase of international patent application PCT/EP2007/002211, filed on Mar. 13, 2007, and claims priority to Swiss patent application number 00395/06, filed Mar. 13, 2006, both of which are hereby incorporated by reference.

TECHNICAL FIELD

The present invention relates to a method for the production of a non-adhering granulate comprising a polyester material, in which the polyester material is introduced into a cooling water flow as a melt and is separated from the cooling water after passing through a cooling stretch.

The subject of the invention is also the use of a thus produced granulate.

The polyester material can concern in particular polyethylene terephthalate or modified copolymers thereof, with modification components on the acid side, e.g. of isophthalic acid, or on the diol side, e.g. of cyclohexanedimethanol.

STATE OF THE ART

DE 103 49 016 B4 for example also starts from a method of the above-mentioned type, a so-called crystallisation phase or post-crystallisation being considered to be necessary subsequent to the granulate formation according to the teaching of this document.

As can be deduced from DE 198 48 245 A1, polyester granulate is initially essentially amorphous and transparent. In this state, it has a tendency to adhere during further processing in the solid phase at and above the glass-transition temperature thereof. By increasing the crystallinity thereof which can be detected by a white colouration, the adhesion can be avoided. According to DE 10 2004 015 515 A1, a crystallisation degree of at least 38% is required for this purpose.

In the case of DE 103 49 016 B4, the post-crystallisation is implemented by using the heat energy still contained in the granulate particles directly after granulation. In order to avoid adhesion of the granulate particles until the desired crystallisation degree has been achieved, it is proposed to shake them or to subject them to vibrations, e.g. by transport via a vibrating or oscillating conveyer.

A high crystallisation degree is however not always desired in the further processing of the granulate because the energy required for melting the granulate is consequently increased.

DESCRIPTION OF THE INVENTION

In the case of the known methods, the post-crystallisation for obtaining a sufficiently crystalline, non-adhering granulate and also the measures for preventing adhesion of the granulate particles already during post-crystallisation implies a not insignificant complexity in chemical engineering and equipment. Furthermore, a specific temperature of the granulate arises necessarily as a function of the granulate size. The object therefore underlying the invention is to improve the initially mentioned method such that it can be implemented in a more rational manner and with less complexity with respect to equipment. In addition, high crystallisation grades >45% are intended to be able to be avoided.

According to the invention, this is achieved according to claim 1 in that the dwell time of the polyester material in the cooling stretch is 0.2-5 sec and in that the cooling water has a pressure of at least 2 bar along the cooling stretch. According to the conduct of the method, the polyester material can be present within the cooling water as a strand or as a granulate.

Post-crystallisation is not required, at least not in every case, for the thus obtained granulate. It has been shown that the granulate does not adhere even without post-crystallisation and mechanical movement if no additional input of external energy takes place. Even when heating under pressure, no adhesion could be detected. The granulate is suitable for direct reprocessing without additional crystallisation possibly using its still high temperature in gas treatments, such as solid phase post-condensation reactors, conditioning reactors for drying, degassing and/or dealdehydation or crystallisation devices (if in fact a higher crystallisation degree is required). There may be mentioned as examples of the further processing, also pneumatic transports and also intermediate storage in silos or in heat-resistant packs.

It is known that an object to be cooled cannot be wetted in the case of very high temperature gradients (Leidenfrost). Under atmospheric conditions or slight excess pressure, this phenomenon also occurs with a polyester melt if the latter is introduced into cooling water. A steam layer is formed on the surface of the polyester material, which has an insulating effect and impedes cooling of the polyester material. Evaporation and condensation in the boundary layer lead in addition to transient states which greatly roughen the surface of the polyester material (formation of craters). The rough surface promotes adhesion of the finished granulate particles. This leads to uncontrolled crystallisation and increased abrasion in subsequent mechanical treatments, as a result of which disruptions and cleaning cycles become necessary and also material loss occurs. Furthermore, because of repeated passing through of the glass-transition temperature, the result can be agglomeration of the granulate particles which leads to further disruptions and loss of quality.

Astonishingly, it was discovered, due to the conditions according to claim 1, that the evaporation and surface cavitation on the granulate particles can be controlled to the extent that the surface of the particles now assumes the structure of an orange skin which reduces the in any case low contact surfaces of the spherical particles so that agglomeration no longer occurs even with further heat treatment. The direct abrupt cooling water contact compels the controlled formation of the surface structure and hence for the first time allows cooling of the melt which is coordinated with the further treatment process and a controllable crystallisation degree which can be in the range of 8 to 45%.

The crystallisation commencing from the core of the granulate particles outwards because of the higher temperature of the solidifying melt prevailing there leads to stresses and shrinkages within the granulate particles which are present themselves in the form of repulsion effects relative to closely situated particles and thus in addition counteract the agglomeration.

In order to avoid adhesion of the finished granulate particles, a very short dwell time of merely 0.2-5.0 sec of the polyester material under the mentioned pressure conditions in the cooling stretch is already sufficient.

By limiting the dwell time under the mentioned pressure conditions in the cooling stretch to 5 sec, preferably 2 sec, a low crystallisation degree of the finished granulate of less than 10% is achieved on the other hand. The finished granulate is essentially amorphous, which can be detected by its transparency. Preferably, the finished granulate thereby has an amorphous proportion of at most 92%, however at least 55%. The polyester material, after separation of the cooling water, also still has an advantageously high temperature for direct further processing, such as e.g. a solid phase post-condensation or drying.

Preferred embodiments of the method according to the invention are characterised in the dependent claims 2-13.

It is thus preferred to choose the dwell time to be within narrower limits between 0.2 to 2 sec, particularly preferred between 0.4 sec and 0.8 sec. The same applies to the pressure which is set preferably between 3 bar and 6 bar. A pressure higher than 6 bar is unnecessary in general for achieving the effect according to the invention and would entail problems in the design of the apparatus.

After passing through the cooling stretch, the pressure of the cooling water is rapidly reduced and then the cooling water is separated from the polyester material. The reduction can be effected in a constriction stretch in the form of a length of pipe with a reduced cross-section or by flow channels. Alternatively, specially formed valves, such as e.g. pinch valves, can be used.

Behind the constriction stretch, evaporation on the surface of the polyester material is desirable because this assists the separation of the cooling water and, by forming an insulating film of vapour, prevents a further cooling of the polyester material which is no longer required or possibly also no longer desired. By choice of temperature of the cooling water at 80° C.-110° C., preferably 85° C. to 95° C., close to the atmospheric boiling point, these effects are assisted in addition. On the other hand, water losses by evaporation are kept minimal.

For various further processing methods, the paring movement of the blades on the nozzle plate in cooperation with the surface tension of the solidifying melt, an average temperature of the finished granulate in the range of 90° C. to 220° C., preferably 150° C.-220° C., is advantageous. This temperature depends inter alia upon the dwell time of the polyester material in the cooling stretch so that it can be adjusted by suitable choice of this dwell time.

As far as the granulation is concerned, the at least one strand of the molten polyester material can be cut up after the outflow thereof into the cooling water flow and hence still before passing through the cooling stretch, which can be effected for example with the help of a perforated plate, an attached set of rotating blades or the like. The diameter of the perforations is thereby in the mm range.

The melt which is preferably configured as at least one molten strand can also be granulated only after being stretched and cooled in the cooling water. Cutting of the strand only after separation of the cooling water would likewise be possible. The resulting granulate particles thereby typically have a weight between 10 and 20 mg.

A water-vapour separator can be used in order to separate the polyester material from the cooling water, which is preceded by the already mentioned constriction stretch for reducing the cooling water pressure. In the case of underwater granulation, a commercially available centrifugal separator can be used. Because of the formation of vapour after the pressure reduction, also a simple sieve bend with a suction device is however sufficient, on which vapour and water are separated from the granulate particles and replaced by air or an inert gas. This embodiment is also possible on a strand which is only cut subsequently.

In the case of direct underwater granulation, which is preferred, the dwell time of the polyester material in the cooling stretch can be adjusted by variation of the cooling water flow, e.g. by controlling the speed of rotation of the water pump, in the cooling stretch since the granulate particles are conveyed by the cooling water flow. In a simple manner, adjustment of the cooling water flow in the cooling stretch is possible in that the cooling water is divided between the cooling stretch and a bypass line to the cooling stretch and is guided back together again in front of the constriction stretch. In that a constant water quantity is conducted via the constriction stretch, the pressure in the cooling stretch remains constant with a change in the division.

As an alternative hereto, it is also possible for the polyester material to be granulated after cooling in the cooling water. In addition, stretching of the polyester material which is then present within the cooling stretch at least partially as a strand can thereby be effected.

A further alternative embodiment provides that the polyester material is only granulated after separation of the cooling water with formation of approximately cylindrical granulate particles. For this purpose, the polyester material passes through the complete cooling stretch as a strand, the granulation is therefore effected only subsequent to the cooling stretch.

According to the invention, and likewise with claim 14, one purpose of use of the method product of the method according to one of the claims 1 to 13 is indicated, the method product being supplied directly to a solid phase post-condensation reactor or drier, preferably for example a tower- and/or shaft drier, with a static fluidised bed.

BRIEF EXPLANATION OF THE FIGURES

The invention is intended to be explained subsequently in more detail with reference to embodiments in conjunction with the drawing. There are shown.

WAYS TO CARRY OUT THE INVENTION

Figure 1:
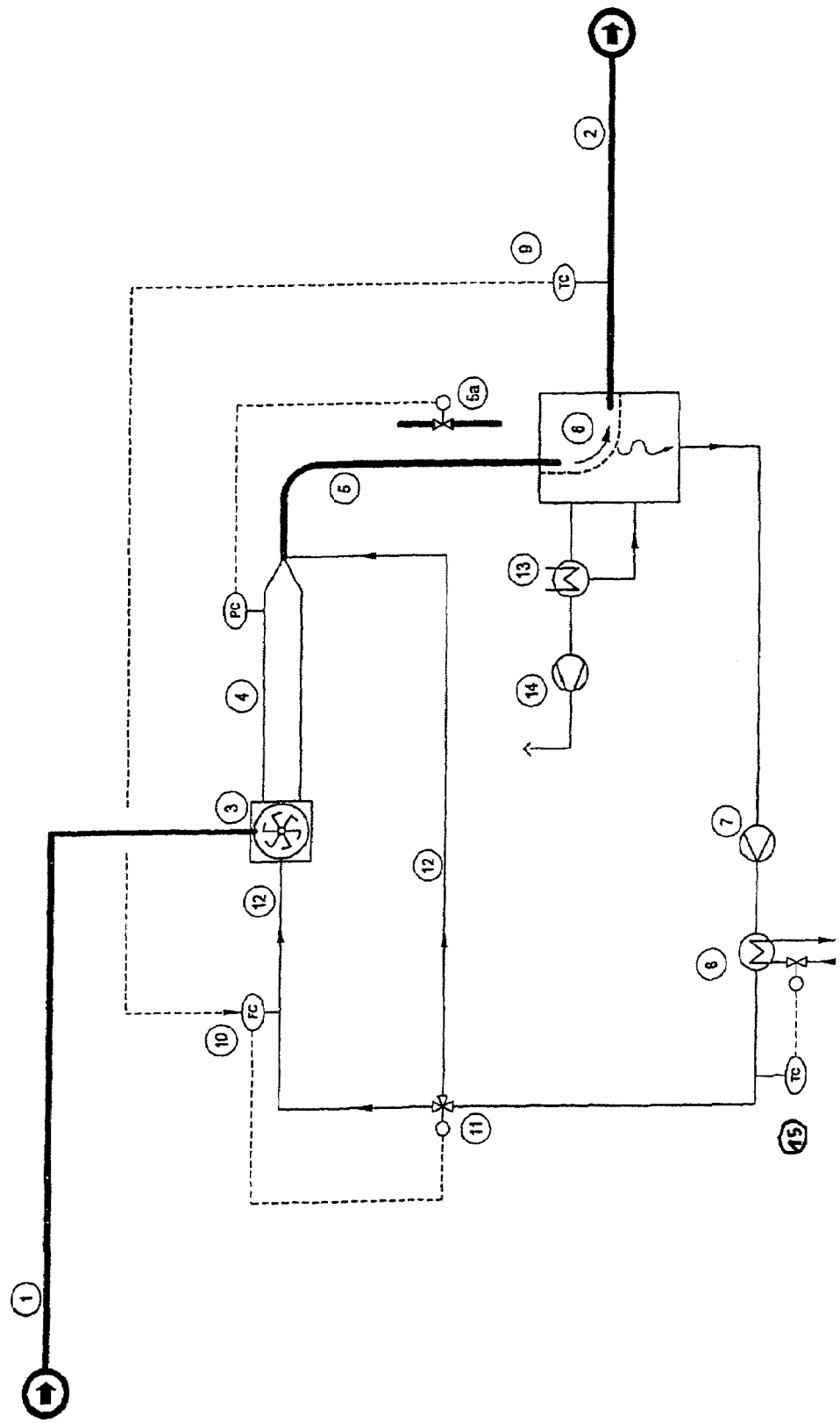
FIG. 1 a diagram of a first embodiment of the invention with underwater cutting.

In both Figures, 1 designates the melt inflow, 2 the granulate outflow and 3 a cutting chamber. A cooling water circulation comprises in series a cooling stretch 4 of typically 0.5-3 m length, a constriction stretch 5, a water and vapour separator 6 and is kept in operation by a water circulation pump 7. The water and vapour separator 6 can concern a simple sieve bend or a commercially available centrifugal separator. In the cooling water circulation, a heat exchanger 8 is contained in addition, with which the temperature of the cooling water can be adjusted and kept constant by means of a temperature control 15. A granulate temperature control is designated with 9 and is in communication with a water quantity control 10. The water quantity control acts on a bypass control valve 11 with which division of the cooling water to the cooling stretch 4 and a bypass 12 can be adjusted. The water and vapour separator 6 is provided with a suction fan 14 which is preceded by a vapour condenser 13. The water circulation pump 7 builds up a pressure in the described cooling water circulation, which is adjusted such that it is greater than 2 bar along the cooling stretch 4. As a variant for adjusting and keeping the pressure constant, another pressure control 16 is provided in FIG. 1, which acts on a control valve 5a of the constriction stretch 5.

Figure 2:
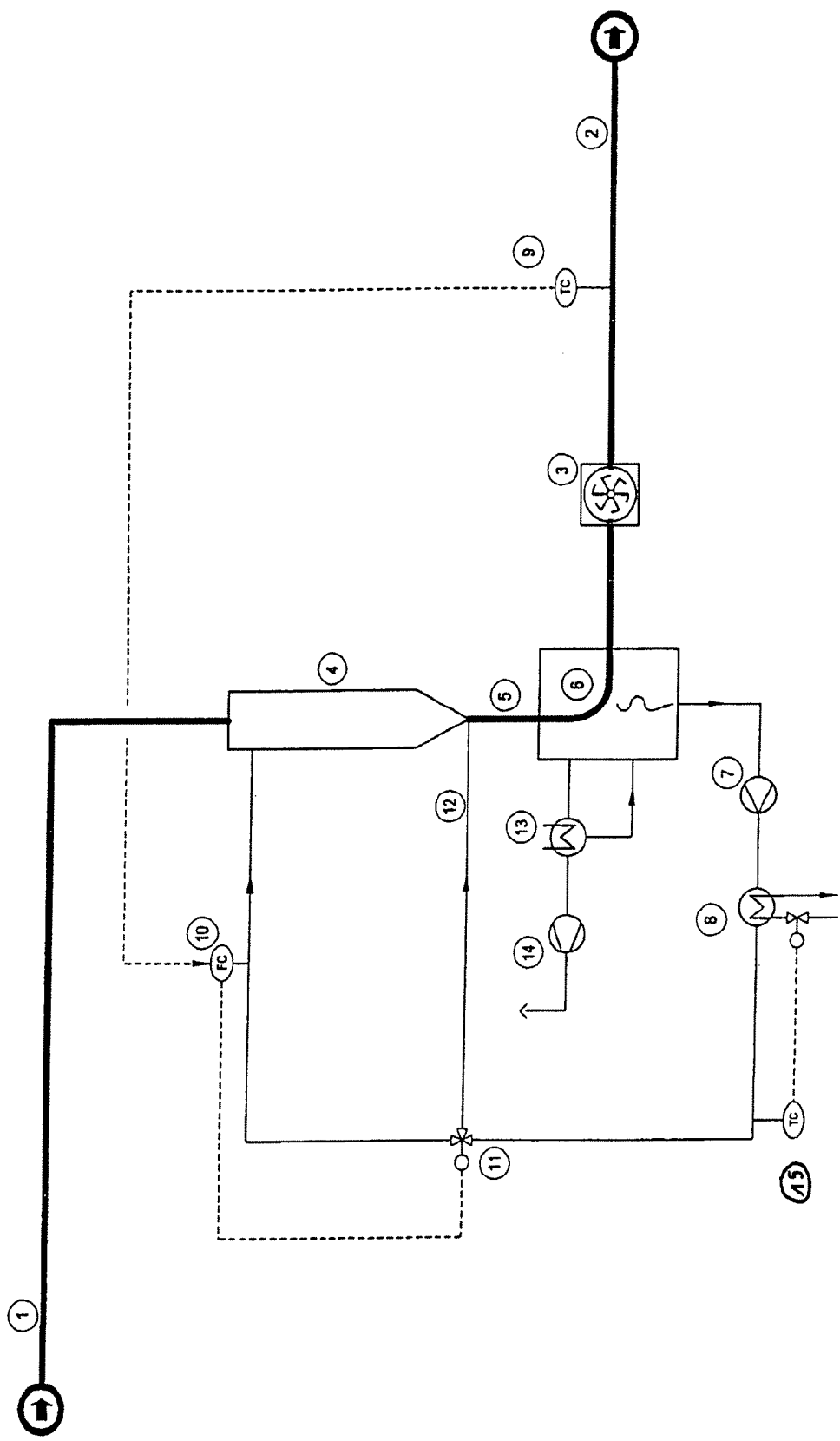
FIG. 2 a corresponding diagram of a second embodiment of the invention with dry cutting.

The two embodiments of FIG. 1 and FIG. 2 differ in the position of the cutting chamber 3. In the embodiment of FIG. 1, the cutting chamber 3 is situated in the cooling water circulation in the region of the melt inflow 1 directly in front of the cooling stretch 4 and is subjected to a flow of cooling water. The cooling water pressure in it is greater than 2 bar, as along the cooling stretch 4. In the embodiment of FIG. 2, the cutting chamber 3 is situated outwith the cooling water circulation between the water and vapour separator 6 and the granulate outflow 2 and consequently is dry.

In the embodiment of FIG. 1, the molten polyester material emerges from preferably a plurality of nozzle holes forming a correspondingly large number of melt strands into the cutting chamber, the melt strands being cut immediately underwater to the required granulate size with a cutting rotor, e.g. a rotating perforated plate. The terminology here is also dieface. Because of the paring movement of the blades on the nozzle plate in cooperation with the surface tension of the solidifying melt, approximately spherical granulate particles are hereby formed. The granulate is conveyed directly into the cooling stretch 4 by means of the circulation water. In the cutting chamber 3 and along the cooling stretch 4, a cooling water pressure greater than 2 bar prevails, as stated already. This water pressure is reduced to ambient pressure in the subsequent constriction stretch 5. The constriction can be effected by an adapted design of the pipeline cross-section in coordination with the quantity of water circulation or by a control valve 5a, such as for example a pinch valve, which is suitable for the 2-phase mixture, as a result of which then the mentioned pressure control in the cooling stretch would also be possible. After the pressure reduction, the water evaporates directly on the still hot surface of the granulate particles and can consequently be separated easily by the water and vapour separator 6. The resulting steam is suctioned off together with ambient air by the suction fan 14 and is condensed in the vapour condenser 13.

The sudden cooling according to the invention at excess pressure of at least 2 bar takes place in the cutting chamber 3, the cooling stretch 4 and also possibly partially even in the constriction stretch 5 also, however the dwell times in the cutting chamber 3 and in the constriction stretch 5 being small because of the geometric ratios relative to the dwell time in the cooling stretch 4. According to the duration of the sudden cooling, the granulate particles are more or less cooled. By adjusting the dwell time in the cooling stretch 4 by means of the water quantity control 10, it is hence possible to adjust the temperature of the finished granulate in a controlled manner, which also functions in the case of a small particle diameter. The granulate temperature controller 9 hereby prescribes as conduct controller the reference value of the water quantity control in the form of a cascade control.

In the embodiment of FIG. 2, likewise a plurality of strands is preferably withdrawn, however they enter directly into the cooling stretch 4 here where they experience a sudden cooling analogously to the previously described granulate. The cutting to form a cylindrical granulate is effected only after the water separation in the cutting chamber 3 which is subsequent to the water and vapour separator 6. The constriction stretch 5 can have the form of narrow channels through which the strands are guided. Moreover, the conduct of the method corresponds to that of the embodiment of FIG. 2.

EXAMPLES

The examples A-D indicated in the subsequent Table relate to the production of polyester granulate applying the previously described embodiment according to FIG. 1. Example E is a comparative example in which an underwater strand granulator was used for the granulation and the cooling water pressure along the cooling-stretch corresponded to ambient pressure. In all the examples, the melt was produced by melting a PET granulate at 290° C.

| Example | Melt flow kg/h | Granulate size mg | Water circulation m$^3$/h | Water temperature ° C. | Cutting chamber pressure barg | Dwell time sudden cooling sec | Average granulate temperature ° C. |
|---|---|---|---|---|---|---|---|
| A | 110 | 19 | 15 | 97 | 4 | 0.5 | 180 |
| B | 110 | 35 | 17 | 99 | 5.1 | 0.45 | 215 |
| C | 110 | 12 | 17 | 102 | 5 | 0.45 | 175 |
| D | 100 | 15 | 12 | 96 | 4 | 0.5 | 160 |
| E | 100 | 15 | 12 | 96 | 0 | 0.5 | 160 |

In examples A-D, the granulate particles emerging from the granulate outflow showed no adhesion even with adiabatic direct filling. In example D, the granulate was subjected in addition to 3 bar pressure and even then did not adhere.

The granulate particles obtained by the comparative example E adhered, in contrast, immediately after the granulate outflow to form fist-sized lumps.

| Reference number list | |
|---|---|
| 1. | Melt inflow |
| 2. | Granulate outflow |
| 3. | Cutting chamber |
| 4. | Cooling stretch |
| 5. | Constriction stretch; 5a. Flow control valve |
| 6. | Water and vapour separator |
| 7. | Water circulation pump |
| 8. | Heat exchanger for circulation water |
| 9. | Granulate temperature control |
| 10. | Water quantity control |
| 11. | Bypass control valve |
| 12. | Bypass to cooling stretch |
| 13. | Vapour condenser |
| 14. | Suction fan water separator |
| 15. | Temperature control |
| 16. | Pressure control |

The invention claimed is:

1. A method of producing a non-adhering granulate above the glass-transition temperature comprising a polyester material, the method comprising introducing the polyester material into a cooling water flow as a melt and separating the polyester material from the cooling water after passing through a cooling stretch, wherein the dwell time of the polyester material in the cooling stretch is 0.2-5.0 sec and wherein the cooling water has a pressure of at least 2 bar along the cooling stretch.

2. The method according to claim 1, wherein the dwell time of the polyester material in the cooling stretch is 0.2-2.0 sec.

3. The method according to claim 1, wherein the cooling water has a pressure of 3-6 bar along the cooling stretch.

4. The method according to claim 1, wherein the temperature of the cooling water is 80° C.-110° C.

5. The method according to claim 1, wherein the dwell time of the polyester material is chosen such that the polyester material has a temperature of 90° C.-220° C. after separation of the cooling water.

6. The method according to claim 1, wherein a water-solids separating device is used for separating the polyester material from the cooling water, said separating device being preceded by a constriction stretch for reducing the cooling water pressure.

7. The method according to claim 1, wherein the cooling water flow in the cooling stretch can be adjusted by an adjustable bypass to the cooling stretch.

8. The method according to claim 1, wherein the polyester material is granulated directly after the inflow thereof into the cooling water flow with formation of approximately spherical granulate particles.

9. The method according to claim 1, wherein the polyester material is granulated after cooling in the cooling water.

10. The method according to claim 1, wherein the polyester material is granulated only after separation of the cooling water with formation of approximately cylindrical granulate particles.

11. The method according to claim 1, wherein a surface quenching above the glass-transition temperature is implemented in the granulate.

12. The method according to claim 1, wherein the produced granulate has an amorphous proportion of at least 55% and at most 92%.

13. The method according to claim 1, wherein the granulation is effected via a perforated plate with an attached set of rotating blades.

14. The method according to claim 1, wherein the melt is formed as at least one melt strand.

15. The method according to claim 2, wherein the dwell time of the polyester material in the cooling stretch is 0.4-0.8 sec.

16. The method according to claim 4, wherein the temperature of the cooling water is 85° C.-95° C.

* * * * *